United States Patent [19]

Schönherr et al.

[11] Patent Number: 5,305,035
[45] Date of Patent: Apr. 19, 1994

[54] PANORAMIC CAMERA WITH OBJECTIVE DRUM

[75] Inventors: Hans-Jörg Schönherr; Hans Zimmet, both of Dresden; Jürgen Krase; Michael Lenk, both of Pirna; Siegfried Hainy; Karl-Heinz Werner, both of Dresden, all of Fed. Rep. of Germany

[73] Assignee: Kamerawerke Noble GmbH, Dresden, Fed. Rep. of Germany

[21] Appl. No.: 100,542

[22] Filed: Jul. 30, 1993

[30] Foreign Application Priority Data

Aug. 8, 1992 [DE] Fed. Rep. of Germany ....... 4226286

[51] Int. Cl.⁵ ............................................. G03B 37/00
[52] U.S. Cl. ........................................................ 354/96
[58] Field of Search ........................ 354/94, 95, 96, 98, 354/99; 352/69, 70, 71

[56] References Cited

U.S. PATENT DOCUMENTS 4,431,289 2/1984 Reinhardt ............................. 354/96

FOREIGN PATENT DOCUMENTS 1173331 1/1965 Fed. Rep. of Germany .

Primary Examiner—Michael L. Gellner
Assistant Examiner—Howard B. Blaneknship
Attorney, Agent, or Firm—Michael J. Striker

[57] ABSTRACT

A panoramic camera has a camera housing having a cylinder segment provided with an image window, an objective drum which is rotatable relative to the cylinder segment about a rotary axis, the cylinder segment having segment flanks located laterally near the image window, the segment flanks being provided with light catching grooves extending parallel to the rotary axis of the objective drum and ending at an angular distance from the outer edges of the cylinder segment, covered by a curvature of the drum.

7 Claims, 2 Drawing Sheets

PANORAMIC CAMERA WITH OBJECTIVE DRUM

BACKGROUND OF THE INVENTION

The present invention relates to a panoramic camera with an objective drum which is rotatable relative to a cylinder segment of the camera housing provided with an image window.

Panoramic cameras of the above-mentioned general type are known in the art. In a known panoramic camera which is disclosed for example in the German document DE-PS 1 173 331, felt inserts are provided for blocking undesired light impingement. The felt inserts mounted in the camera housing rub during the receipt against the casing of the drum and brake the drum turning, which must be compensated by higher force application during driving. Moreover, the felt inserts have a tendency for embedding dust particles which further increase the above-mentioned braking friction and in addition cause scratching traces on the objective drum.

SUMMARY OF THE INVENTION

Accordingly, it is an object of the present invention to provide a panoramic camera which avoids the disadvantages of the prior art.

More particularly, it is an object of the present invention to provide a panoramic camera with improved features for obtaining the required light safety.

In keeping with these objects and with others which will become apparent hereinafter, one feature of the present invention resides, briefly stated, in a panoramic camera with an objective drum in which the cylinder segment is provided laterally near the image window with segment flanks formed with light catching grooves which extend parallel to the rotary axis of the objective drum, and the light catching grooves end at a distance from the outer edges of the cylinder segment, which is covered by the curvature of the objective drum.

When the panoramic camera is designed in accordance with the present invention, it eliminates the disadvantages of the prior art and provides for the above-mentioned highly advantageous results.

In accordance with another feature of the present invention, the light catching groove has a depth which increases relative to the image window in a wedge-shaped manner.

Still a further advantageous feature of the present invention is that the light catching groove is provided with a portion which is deepened in a wedge-shaped manner relative to the image window and a cylindrical portion connected with the image window.

When in accordance with a further feature of the present invention the light catching groove has a rectangular cross-section, it provides for a technologically advantageous solution.

Finally, in accordance still another advantageous feature of the present invention, a light absorbing layer is arranged additionally in the light catching groove.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
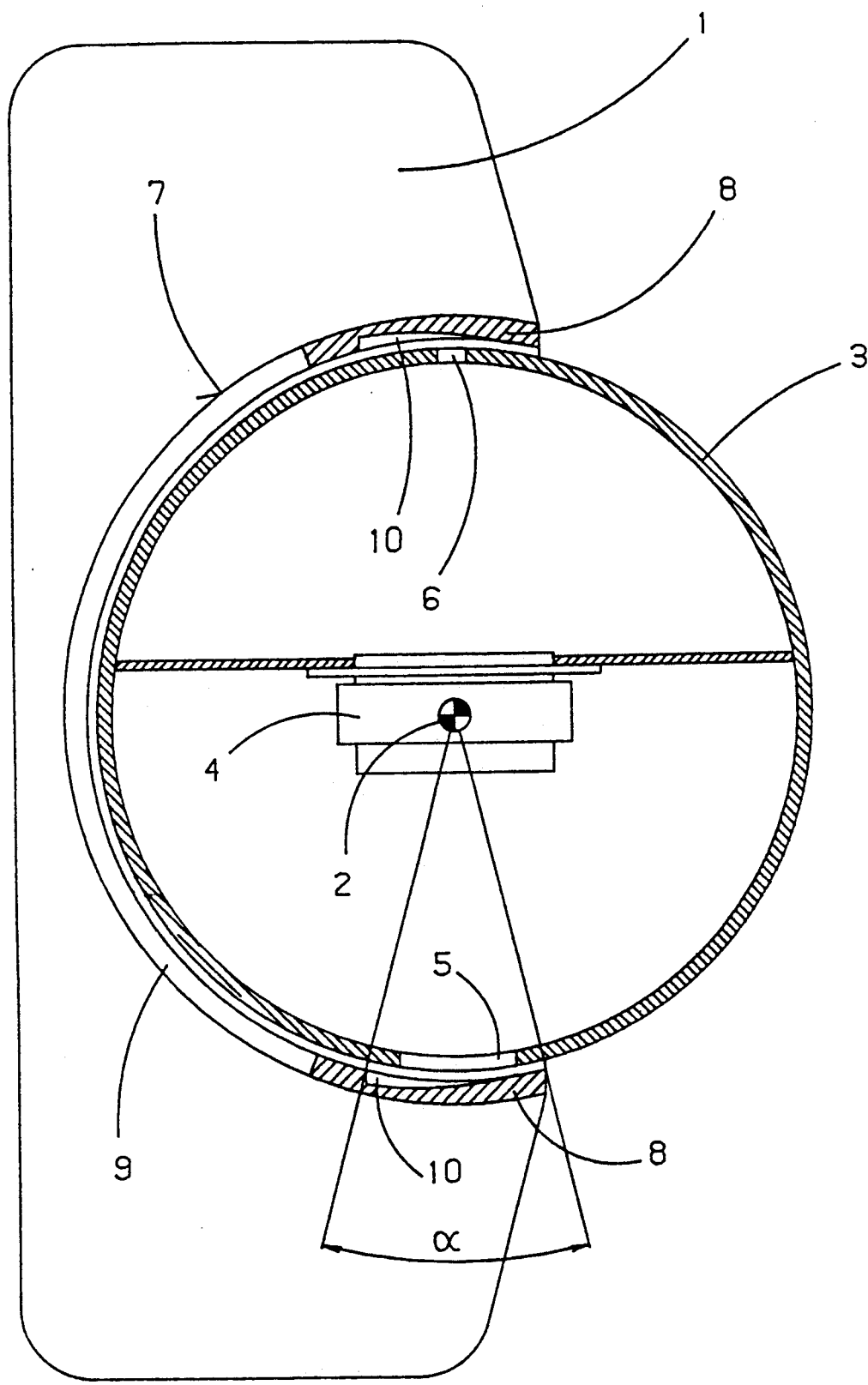
FIG. 1 is a view showing a camera housing with an objective drum in accordance with the present invention.

A panoramic camera in accordance with the present invention has a camera housing which is identified as a hole with reference numeral 1. A drum 3 is supported in the camera housing rotatably about an axis 2, and an objective 4 is arranged in the drum 3. The camera is provided with a light inlet opening 5 and illuminating slots 6 which extend through the casing of the drum 3 and are located opposite to one another in an objective ray path. A cylinder segment 7 is provided concentrically to the drum 3 in the camera housing 1 and has segment flanks 8 arranged so that an image window 9 is located between the flanks.

Light catching grooves 10 are provided in the segment flanks 8 and extend parallel to the rotary axis 2 of the drum 3. The light catching grooves 10 are spaced from the outer edges of the cylinder segment 7 at such an angular distance α, that the ends of the light catching grooves 10 which face toward the image window 9 are covered relative to the outer edges of the cylinder segment 7 by the drum 3 as can be seen from FIG. 2. An imaginary straight line "g" between the outer edge of the cylinder segment 7 and the end of the light catching groove 10 which faces the image window 9, intersects the outer surface of the drum 3.

Figure 2:
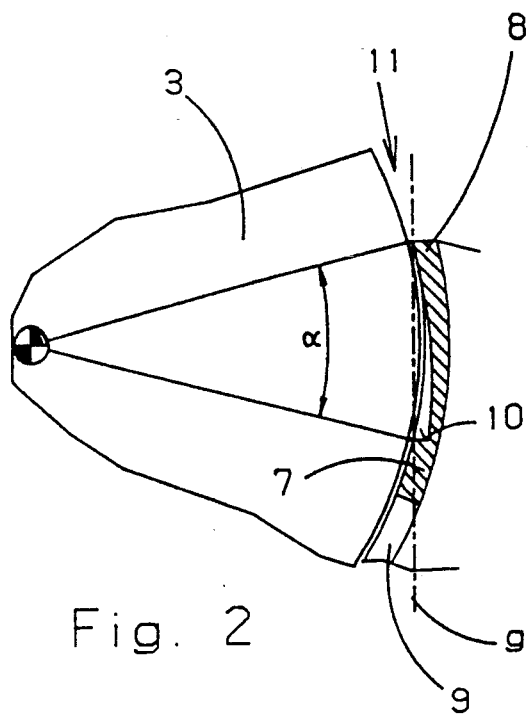
FIG. 2 is a view showing a light catching groove of the inventive panoramic camera.

The panoramic camera in accordance with the present invention operates in the following manner:

When undesired light enters through the gap 11 [see FIG. 2] between the drum 3 and the cylinder segment 7, the light rays reach the light catching groove 10. If the light rays are not absorbed by the matted walls of the cylinder segment 7 or the light catching groove 10 or the outer surface of the drum 3, the light rays, directly or after multiple reflection on the outer surface of the drum and the light catching grooves, reach the end which faces the image window 9. At this end which is located substantially radially to the drum axis 2, these residual light rays are turned back and guided back directly or after multiple reflection through the gap 11.

Figure 3:
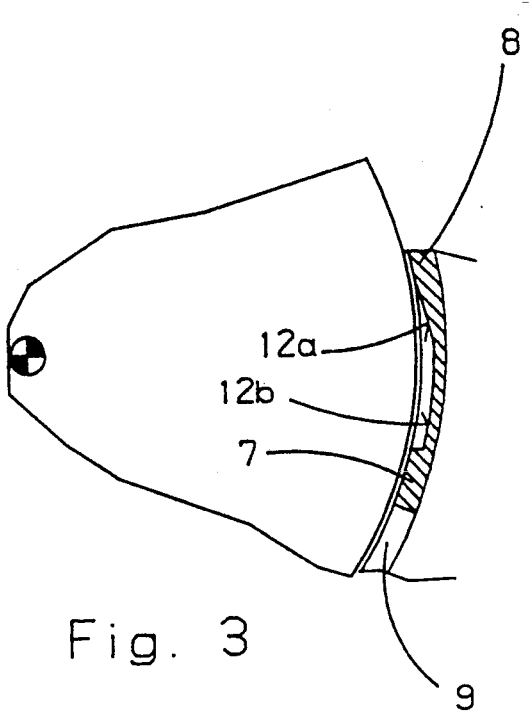
FIG. 3 is a view showing a further modification of the light catching groove in accordance with the invention.

In a further embodiment shown in FIG. 3, the segment flanks 8 are provided with a light catching groove 12 which has a portion 12a with a depth increasing in a wedge-shaped manner relative to the image window 9 and a portion 12b which is cylindrical and faces the image window 9. The operation of this embodiment corresponds to the operation of the first embodiment of the invention.

Figure 4:
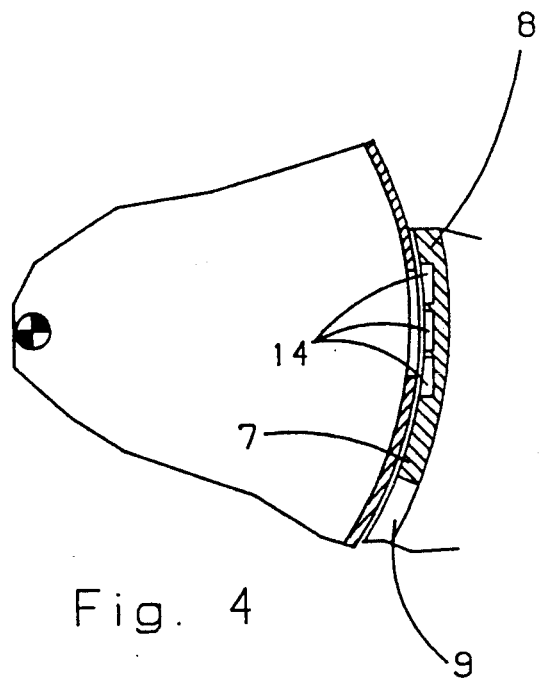
FIG. 4 is a view showing a technologically favorable further embodiment of the invention.

FIG. 4 shows another embodiment which is favorable technologically for manufacturing purposes. In the embodiment shown in FIG. 4 the light catching groove 14 has a rectangular cross-section.

Figure 5:
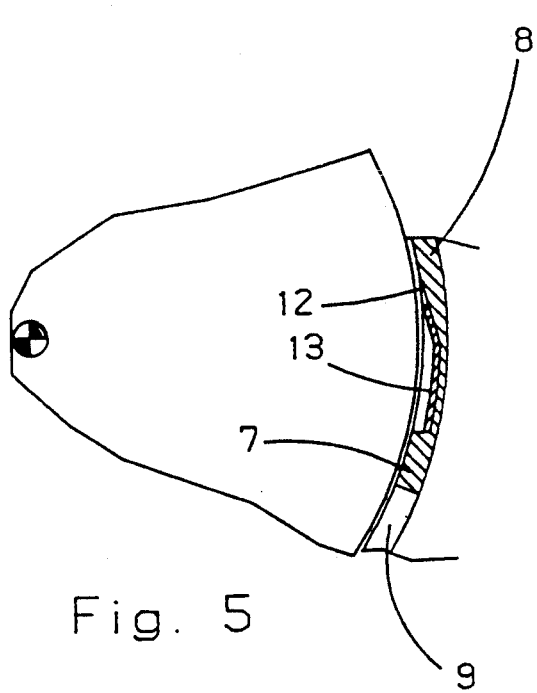
FIG. 5 is a view showing a light catching groove with a light absorbing layer in accordance with the invention.

FIG. 5 shows another embodiment of the invention. Here an additional light absorbing layer 13 is inserted in the light catching groove 12. The light absorbing layer 13 can be composed of any suitable material.

In accordance with a further not-shown embodiment of the invention, a light catching groove can be provided with a plurality of saw-tooth-shaped wedge surfaces or with a plurality of rectangular grooves.

It will be understood that each of the elements described above, or two or more together, may also find a useful application in other types of constructions differing from the types described above.

While the invention has been illustrated and described as embodied in a panoramic camera with an objective drum, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A panoramic camera, comprising a camera housing having a cylinder segment provided with an image window; an objective drum which is rotatable relative to said cylinder segment about a rotary axis, said cylinder segment having segment flanks located laterally near said image window, said segment flanks being provided with light catching grooves extending parallel to said rotary axis of said objective drum and ending at an angular distance from the outer edges of said cylinder segment, covered by a curvature of said drum.

2. A panoramic camera as defined in claim 1, wherein at least one of said light catching grooves has a depth which increases in a wedge-shaped manner relative to said image window.

3. A panoramic camera as defined in claim 1, wherein at least one of said light catching grooves has a first portion which deepens relative to said image window in a wedge shaped manner and a second cylindrical portion which follows said image window.

4. A panoramic camera as defined in claim 1, wherein at least one of said light catching grooves has a rectangular cross-section.

5. A panoramic camera as defined in claim 1; and further comprising at least one light absorbing sheet arranged in at least one of said light catching grooves.

6. A panoramic camera as defined in claim 1, wherein at least one of said light catching grooves has a plurality of partial grooves.

7. A panoramic camera as defined in claim 6, wherein said partial grooves have a rectangular cross-section.

* * * * *